US007950925B2

(12) United States Patent
McDaniel et al.

(10) Patent No.: US 7,950,925 B2
(45) Date of Patent: May 31, 2011

(54) INTERACTING WITH CONSUMERS TO INFORM, EDUCATE, CONSULT, AND ASSIST WITH THE PURCHASE AND USE OF PERSONAL CARE PRODUCTS

(75) Inventors: Mary Lou McDaniel, Appleton, WI (US); Mary Jo Meyer, Neenah, WI (US); Jennifer Marvin, Greenville, WI (US); Kurtis F. Schweitzer, Greenville, WI (US); James Jay Tanner, Winneconne, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 1374 days.

(21) Appl. No.: 11/026,845

(22) Filed: Dec. 30, 2004

(65) Prior Publication Data

US 2006/0149570 A1 Jul. 6, 2006

(51) Int. Cl.
G09B 25/00 (2006.01)
G09G 5/00 (2006.01)
(52) U.S. Cl. .......................... 434/377; 434/100; 345/630
(58) Field of Classification Search .................... 434/81, 434/98–100, 350, 377; 382/162, 167, 190, 382/203, 274, 286, 289, 296, 298, 100; 345/589, 345/592, 629–640
See application file for complete search history.

(56) References Cited

U.S. PATENT DOCUMENTS

| 5,478,238 | A | * | 12/1995 | Gourtou et al. ............... 434/100 |
| 5,515,268 | A | * | 5/1996 | Yoda .............................. 705/26 |
| 5,622,692 | A | * | 4/1997 | Rigg et al. ....................... 424/63 |
| 5,724,521 | A | * | 3/1998 | Dedrick .......................... 705/26 |
| 5,781,650 | A | * | 7/1998 | Lobo et al. ..................... 382/118 |
| 5,850,463 | A | * | 12/1998 | Horii ............................. 382/118 |
| 5,971,763 | A | * | 10/1999 | Yau ............................... 434/100 |
| 6,093,027 | A | * | 7/2000 | Unger et al. ................... 434/429 |
| 6,197,008 | B1 | | 3/2001 | Hagele |
| 6,263,500 | B1 | * | 7/2001 | Yoshida et al. ................. 725/25 |
| 6,310,627 | B1 | * | 10/2001 | Sakaguchi ..................... 345/630 |
| 6,404,426 | B1 | * | 6/2002 | Weaver .......................... 345/419 |
| 6,604,609 | B2 | * | 8/2003 | Bruce et al. ..................... 186/52 |
| 6,648,864 | B2 | * | 11/2003 | Ronn et al. ............... 604/385.01 |
| 6,719,565 | B1 | * | 4/2004 | Saita et al. ...................... 434/94 |
| 6,734,858 | B2 | | 5/2004 | Attar et al. |
| 6,761,697 | B2 | * | 7/2004 | Rubinstenn et al. .......... 600/587 |
| 6,810,300 | B1 | * | 10/2004 | Woltman et al. .............. 700/132 |
| 6,937,755 | B2 | * | 8/2005 | Orpaz et al. ................... 382/162 |
| 7,006,657 | B2 | * | 2/2006 | Bazin ............................ 382/100 |

(Continued)

OTHER PUBLICATIONS

"Medline Plus: Interactive Health Tutorials," http://www.nlm.nih.gov/medlineplus/tutorial.html, Feb. 2004, 3 pages, U.S. National Library of Medicine and the National Institutes of Health, U.S.A.

(Continued)

*Primary Examiner* — Xuan M Thai
*Assistant Examiner* — Kang Hu
(74) *Attorney, Agent, or Firm* — Armstrong Teasdale LLP (57) ABSTRACT

Educating a consumer about a personal care product. A request for information regarding a personal care product is received from a consumer. A description of one or more physical characteristics associated with the consumer and related to the personal care product is also received from the consumer. In response to the received request and description, a visual representation of a three-dimensional model is provided to the consumer. The three-dimensional model is a function of the received physical characteristics and the personal care product.

38 Claims, 4 Drawing Sheets

U.S. PATENT DOCUMENTS

| | | |
|---|---|---|
| 7,011,528 B2 * | 3/2006 | Tweet et al. .................. 434/262 |
| 7,056,267 B2 * | 6/2006 | Demas ........................... 482/90 |
| 7,104,800 B2 * | 9/2006 | Ortiz-Valero et al. ........ 434/371 |
| 7,237,676 B2 * | 7/2007 | Celia ............................. 206/569 |
| 7,324,953 B1 * | 1/2008 | Murphy ......................... 705/10 |
| 7,328,177 B1 * | 2/2008 | Lin-Hendel .................... 705/27 |
| 7,490,382 B2 * | 2/2009 | Benjamin et al. .......... 15/104.94 |
| 2001/0037191 A1 * | 11/2001 | Furuta et al. ..................... 703/6 |
| 2002/0013815 A1 | 1/2002 | Obradovich et al. |
| 2002/0071604 A1 | 6/2002 | Orpaz et al. |
| 2002/0165799 A1 | 11/2002 | Jaffe et al. |
| 2003/0013994 A1 | 1/2003 | Rubinstenn et al. |
| 2003/0065524 A1 * | 4/2003 | Giacchetti et al. ............... 705/1 |
| 2003/0065526 A1 * | 4/2003 | Giacchetti et al. ............... 705/1 |
| 2003/0065578 A1 | 4/2003 | Peyrelevade et al. |
| 2003/0065589 A1 * | 4/2003 | Giacchetti ...................... 705/27 |
| 2003/0065636 A1 * | 4/2003 | Peyrelevade .................... 706/62 |
| 2003/0120534 A1 * | 6/2003 | Giacchetti et al. .............. 705/10 |
| 2004/0110113 A1 * | 6/2004 | Huang et al. .................. 434/100 |
| 2004/0257361 A1 * | 12/2004 | Tabakman et al. ............ 345/419 |
| 2006/0110417 A1 * | 5/2006 | Hamlin ......................... 424/401 |

OTHER PUBLICATIONS

Patient Education Institute, http://www.patient-education.com/, Aug. 2004, 1 page, U.S.A.

"How to Insert Tampax Tampons," http://www.beinggirl.com/en_US/teen/younger/pages/p_tampax_howto.jhtml, accessed Nov. 2004, 3 pages, The Procter and Gamble Company, U.S.A.

Girlspace!, http://www.girlspace.com, 2004, 2 pages, Kimberly-Clark Worldwide, Inc., U.S.A.

Kang Hu, Office Action for U.S. Appl. No. 11/026,833, May 1, 2009, 12 pages, United States Patent and Trademark Office, US.

* cited by examiner

INTERACTING WITH CONSUMERS TO INFORM, EDUCATE, CONSULT, AND ASSIST WITH THE PURCHASE AND USE OF PERSONAL CARE PRODUCTS

TECHNICAL FIELD

Embodiments of the present invention relate to the field of personal care education. In particular, embodiments of this invention relate to methods of confidential, consumer-specific personal care education for the selection, purchase, and instruction of personal care products for personal hygiene needs.

BACKGROUND OF THE INVENTION

A consumer's lack of understanding or embarrassment with his/her body makes it difficult to communicate and have the consumer understand the benefits of various personal care products. For example, female consumers may not understand the benefits of interlabial products. Interlabial products differ from traditional pads and tampons because they are placed in the interlabial region of the body. Personal care education is needed to assist the consumer with personal hygiene habits and products.

Previous methods of informing consumers of personal hygiene habits and products have been via print, radio, television and most recently the Internet. These communication methods are generally public, one way (e.g., no consumer interaction) and primarily focused at selling consumer products while only providing limited information of male/female physiological needs and changes over time.

Accordingly, a system for providing personal care education and instruction in a confidential, discreet, and non-threatening manner is desired to address one or more of these and other disadvantages.

SUMMARY OF THE INVENTION

Embodiments of the invention educate a consumer about a personal care product. In one embodiment, the invention receives from a consumer a request for information regarding the personal care product and a description of one or more physical characteristics associated with the consumer and related to the personal care product. The invention provides the requested information to the consumer in the form of a visual representation of a three-dimensional model. The three-dimensional model depicts a human form with the physical characteristics of the consumer interacting with the personal care product.

Embodiments of the invention focus on discreet interaction with consumers or users either one-on-one or to a broad audience in the areas of health, hygiene, and general well being (e.g., diet, lifestyle, stresses, genetics). The invention provides for and encourages interaction with the consumer and manufacturer, manufacturer representative, spokesperson, and/or medical professional. The invention allows responses to be explained in non-technical language (e.g., layman's terms) with tasteful, graphic medical images via life-like models or videos, for example, to provide visual and/or audio instructions or explanations on how to use and understand the benefits of specific product forms for specific bodily health hygiene care and prevention. The consumer may interact with embodiments of the invention by asking for additional information or other types of explanations (e.g., more medical or product driven).

In one form, a method educates a consumer about a personal care product. The method includes receiving a request from a consumer for information regarding a personal care product. The method also includes receiving from the consumer a description of one or more physical characteristics associated with the consumer and related to the personal care product. The method further includes providing to the consumer the requested information in the form of a visual representation of a three-dimensional model. The three-dimensional model is a function of the received physical characteristics and the personal care product.

In another form, a system educates a consumer about a personal care product. The system includes means for receiving a request from a consumer for information regarding a personal care product and for receiving from the user a description of one or more physical characteristics associated with the consumer and related to the personal care product. The system also includes means for providing to the consumer the requested information in the form of a visual representation of a three-dimensional model. The three-dimensional model is a function of the received physical characteristics and the personal care product. The system further includes means for manipulating the provided visual representation of the three-dimensional model responsive to input from the consumer.

In still another form, a method enables a resource to educate a consumer. The method includes transmitting, from the consumer to the resource, a request for information regarding a personal care product. The method also includes transmitting, from the consumer to the resource, a description of one or more physical characteristics associated with the consumer and related to the personal care product. The method further includes transmitting, from the resource to the consumer, the requested information in the form of a visual representation of a three-dimensional model. The three-dimensional model is a function of the physical characteristics and the personal care product.

In yet another form, a method educates a consumer about a personal care product in a confidential setting. The method includes receiving, by a human agent, a request from a consumer for information regarding a personal care product. The method also includes receiving from the consumer a description of one or more physical characteristics associated with the consumer and related to the personal care product. The method further includes selecting a multimedia resource based on the personal care product and the received description of the one or more physical characteristics. The method also includes providing to the consumer the requested information confidentially in the form of the selected multimedia resource.

Alternatively, the invention may comprise various other methods and apparatuses.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE INVENTION

Figure 2:
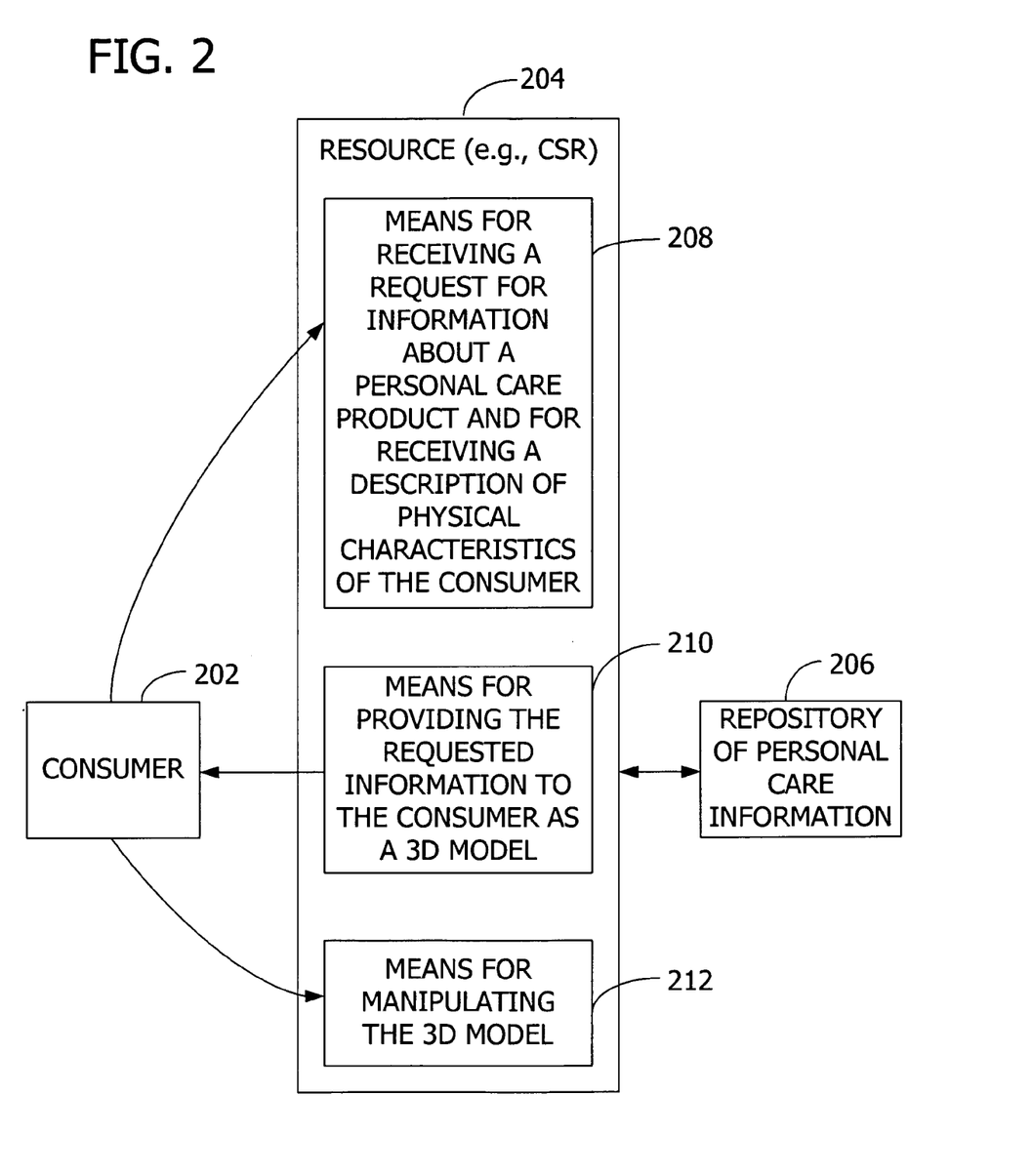
FIG. 2 is an exemplary block diagram illustrating interaction between a consumer and a resource.

Today's busy consumers do not have time to stand in retail stores and read about each new or current product in the market place. In an embodiment as shown in FIG. 2, a customer service representative (CSR), agent, or the like confidentially explains and demonstrates to a consumer while they are on the telephone step-by-step application of a specific product, body functions, hygiene care, or how-to demonstrations such as changing a diaper, inserting a tampon, bathing an adult, and proper wiping. If the consumer fails to comprehend, he/she may immediately speak up and the CSR will provide the appropriate demonstration, detailed explanation, or other options for using the product. The demonstration or explanation may be visual with life-like models, products, or a prerecorded video with a medical professional responding to that specific question in a personal and caring professional manner. The interaction continues until the consumer comprehends the instructions or explanation.

Embodiments of the invention include communication tools to interact one-on-one with consumers to provide personal yet professional responses to their personal hygiene questions. The invention is applicable for all personal care products used by the consumer or for a caretaker of an individual requiring these products. Whether the interaction is through the telephone, electronic mail, fax, or a network such as the Internet, the invention allows both men and women to interact with professionals in a private, non-threatening, personal manner. Further, the invention minimizes the embarrassment of understanding male/female personal hygiene needs as they change over time, either for themselves or in a caretaker role.

Figure 1:
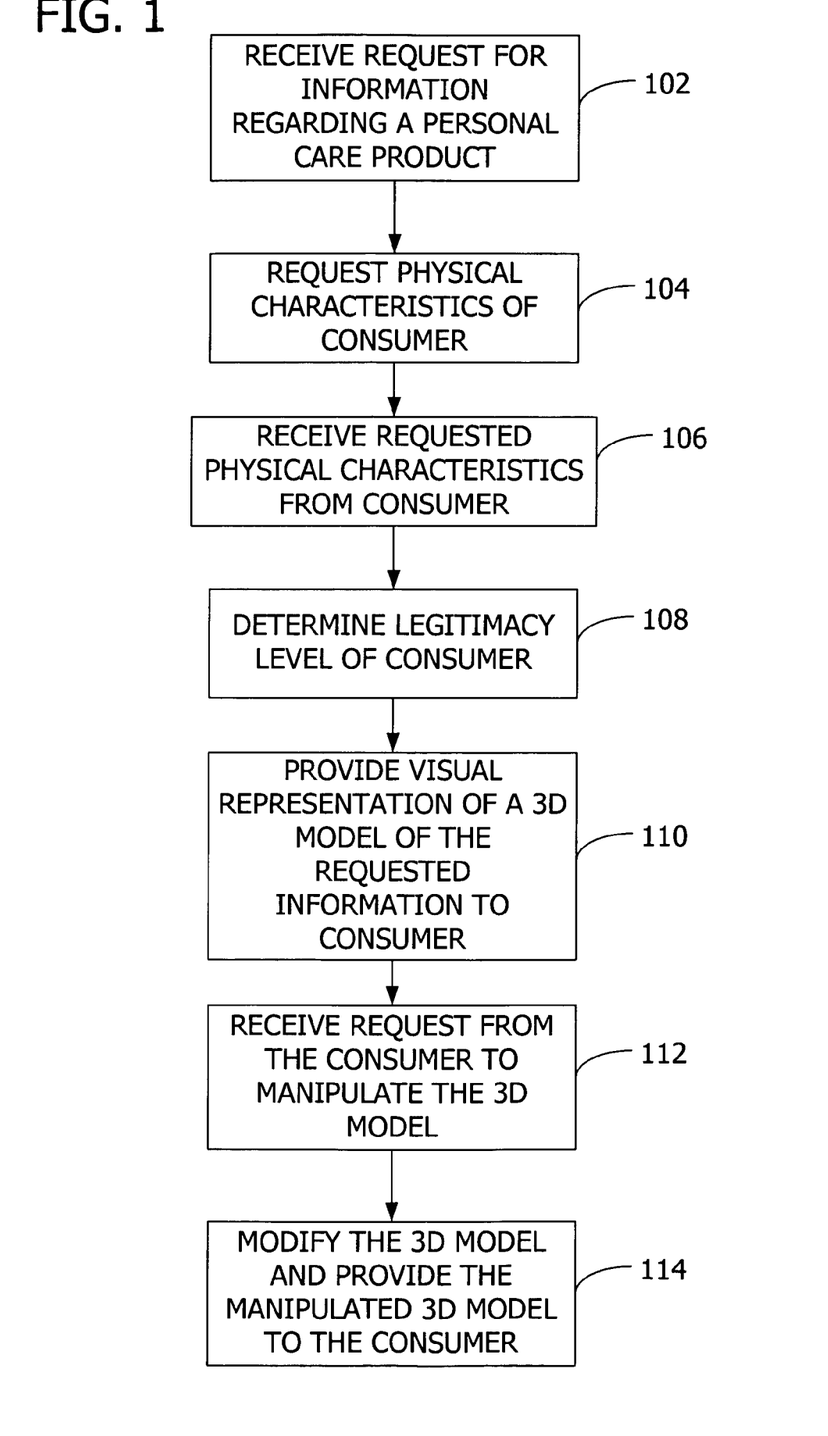
FIG. 1 is an exemplary flow chart illustrating operation of an embodiment of the invention.

Referring first to FIG. 1, an exemplary flow chart illustrates operation of an embodiment of the invention. In particular, FIG. 1 illustrates a method for educating a consumer about a personal care product. The method includes receiving a request at 102 from a consumer for information regarding a personal care product (e.g., via a telephone call, an electronic mail message, or instant messaging text message). For example, consumers may seek usage instructions for personal care products such as baby care products, elder care products, and/or feminine care products. In addition, the personal care products may include products for monitoring personal conditions such ovulation, pregnancy, blood sugar, cholesterol, temperature, infections, and hydration/dehydration levels. In response to the received request, the method screens the consumer to obtain personal data such as physical characteristics from the consumer. For example, the method includes requesting physical characteristics or the like of the consumer at 104 such as height, weight, gender, age, body geometry, spoken language, education level, and physical limitations (e.g., loss of hearing, sight, mobility or limbs) specific to the personal care product. If the personal care product relates to adult diapers, for example, a requested physical characteristic may include the consumer's waist size measurement.

The method receives from the user a description of the physical characteristics associated with the consumer and related to the personal care product at 106. In one example, the method of requesting the physical characteristics may take the form of the agent (e.g., live, intelligent, or the like) or consultant querying the consumer. The questions not only help to define the appearance of the three-dimensional model, but also to help the agent assist the consumer with product usage issues, with hygiene issues, and to generally improve the consumer's appearance. For example, the questions may relate to ethnicity (as it affects anatomy). Further, questions for female consumers may relate to shaving habits (e.g., bikini wax or Brazilian wax) and/or the amount of pubic hair because menses may become trapped in pubic hair. Other questions relate to labial details such as whether the labia majora overlap and/or whether the labia minora extend past the labia majora because these details affects fluid wicking along the body, increased odor, and potential infection. Other questions may relate to the presence of genital jewelry as this affects irritation, hygiene and odor. Other questions may relate to pregnancy (e.g., the quantity of vaginal births and episiotomies). For example, sometimes a faulty episiotomy (e.g., a 'missed stitch') results in an additional place where menses may exit the body and cause double spotting. In this example, the agent may recommend that the consumer use a longer sanitary napkin. Other questions may relate to uterine or bladder prolapse as it affects why the consumer may experience more irritation with certain products. In addition, the agent may recommend a doctor check-up for the consumer based on the consumer responses to the questions. These exemplary questions illustrate the very personal nature of personal care instruction and education. As such, and due to reduced time with physicians, the consumer may feel more comfortable with or more likely to use embodiments of the invention.

Additional exemplary questions and methods for obtaining the physical characteristics of the consumer and for personal care education are shown in U.S. Pat. Nos. 6,093,027, 6,604,609, and 6,648,864, all of which are hereby incorporated by reference herein.

In response to the received physical characteristics, the method provides to the consumer the requested information at 110 in the form of a visual representation of a three-dimensional model. The three-dimensional model is a function of the received physical characteristics and the personal care product. The visual representation of the three-dimensional model may include, for example, a still image or video customized to the consumer's physical characteristics in combination with the particular personal care product. The generated three-dimensional model exhibits the physical characteristics of the user as defined by the received data. In one exemplary embodiment of a three-dimensional model of a vagina, the details of the backward angle of the vagina may be effectively shown as dotted lines on the three-dimensional model, or the body shown transparently in outline form with a tampon in color.

In addition, the method may receive a request from the consumer to manipulate the provided visual representation of the three-dimensional model at 112. For example, the request to manipulate may include a request to pan, tilt, zoom, rotate, scale, flip, brighten, or darken the visual representation. Further, the request to manipulate may include a request to adjust the point-of-view, adjust the lighting, and adjust any colors in the visual representation (e.g., adjust the skin color of the human subject visually represented by the three-dimensional model). Further, the method may receive a request for additional information (e.g., more detailed information) or for related information. The method modifies the three-dimensional model and provides the visual representation of the modified three-dimensional model to the consumer at 114.

While the selection of the visual representation of the three-dimensional model is based on user input (e.g., the physical characteristics of the user and the personal care product), the selection does not necessarily involve customized generation or rendering from the data supplied by the consumer. In one form, a plurality of pre-existing models for each product may be developed with each model having different physical characteristics. In this case, the model with the closest physical characteristics to the consumer is provided. If the personal care product relates to adult diapers, for example, the three-dimensional model includes a human form conforming to the consumer's body geometry and waist size in combination with the adult diaper to demonstrate the fastening and/or wearing of a diaper. In this example, three pre-existing models of an adult diaper may show physical characteristics of a person weighing 150 pounds, 200 pounds, and 250 pounds. A consumer weighing 180 pounds will be provided with the 200-pound model. In this case, modifying or manipulating the provided model includes selecting a different model (e.g., providing the 150-pound model in response to the consumer indicating that the 200-pound model looks heavier than the consumer does).

Alternatively or in addition, pre-existing models or generated models can be adjusted or modified by reference to anthropometric data (e.g., comparative measurements of the human body used as indices of growth and development with respect to length, weight, head circumference variations and other body dimensions). For example, consider a twenty-one year old consumer requesting information, and the closest available information is a model of a nineteen-year-old consumer. In this example, the model of the nineteen-year-old consumer could be modified according to anthropometric data corresponding to the physical characteristics of a twenty-one year old consumer to reflect two years of growth so that the model of the nineteen-year-old consumer more closely approximates the physical characteristics of the twenty-one year old consumer.

In one embodiment, the invention not only provides the visual representation of the three-dimensional model to the consumer, but also displays the visual representation of the three-dimensional model to the consumer. That is, displaying the visual representation is performed by an aspect of the invention. In one example, the invention displays a sequence of images (e.g., a series of events pertaining to the personal care product) to animate the three-dimensional model. For example, the series of events may illustrate and animate the insertion of a tampon.

Alternatively or in addition, the invention provides the requested information to the consumer as a live or prerecorded audio and/or video presentation. In addition, the requested information may be delivered to the consumer via postal mail or via electronic means. For example, a compact disc (CD) containing a video presentation or interactive tutorial (e.g., implemented by a hypertext markup language) may be sent to the consumer.

In one embodiment, a human agent receives the request for information from the consumer about the personal care product along with the physical description of the consumer. The human agent selects a multimedia resource for the consumer based on the personal care product and the physical description of the consumer. The selection may occur from a repository or library of multimedia resources. The multimedia resource may include, but is not limited to, one or more of the following: audio, video, and still images. For example, the multimedia resource may include textual instructions, a visual representation of a three-dimensional model, a movie, and/or an audio clip. The human agent responds to the request for information by confidentially providing the consumer with the selected multimedia resource.

In another embodiment, the invention determines a legitimacy level of the consumer at 108 to limit the dissemination of images of three-dimensional models which may not be suitable for certain audiences. Exemplary criteria for the legitimacy level include age, gender, education level, or religion. Each of the legitimacy level criteria has an affect on the three-dimensional model that is provided to the consumer. For example, the legitimacy level may determine the image quality or colors of the three-dimensional model, the realism of the image, and the detail in the image. In another example, the invention selects or generates one or more of the following three-dimensional model as a function of the legitimacy level: a black-and-white mesh, a color mesh, a high-resolution image, and a low-resolution image. The use of a black and white mesh or a mesh with non-skin colors may avoid offending the consumer.

Another criterion for the legitimacy level is whether the consumer has registered with the content source maintaining the information. For example, registered consumers may receive higher resolution images than non-registered consumers. The invention provides the image of the three-dimensional model to the consumer as a function of the determined legitimacy level.

In one embodiment, one or more computer-readable media have computer-executable instructions for performing the method illustrated in FIG. 1.

In one embodiment, providing the requested information assists the consumer in making a purchase decision regarding the personal care product. That is, after the one-on-one interaction, the consumer may then order the appropriate personal care products if the consumer so desires. For example, in such an embodiment, the CSR may provide a purchase incentive (e.g., rebate, coupon, instant savings, or a free gift) relating to the personal care product to the consumer to encourage the consumer to purchase the personal care product. Alternatively or in addition, the CSR may provide a coupon for a related personal care product in an attempt to cross-sell the related personal care product. Another embodiment involves recommending a product via the means described in U.S. Pat. Nos. 6,093,027, 6,604,609, and 6,648,864, all of which have been previously incorporated by reference herein. In another embodiment, the consumer has already purchased the product, and proceeds to use the product as instructed by the CSR. In yet another embodiment, the CSR is able to resolve product complaints from the consumer that originate from incorrect use of the product.

Referring next to FIG. 2, an exemplary block diagram illustrates interaction between a consumer 202 and a resource 204 for obtaining personal care information from a repository 206. The embodiment of FIG. 2 includes means for receiving a request at 208 from the consumer 202 for information regarding a personal care product and for receiving from the user a description of one or more physical characteristics associated with the consumer 202 and related to the personal care product. A telephone (e.g., a wireless telephone, or a wireless telephone equipped with a camera), computing device (e.g., a personal computer, a personal digital assistant, or a laptop), web site, customer service representative, agent, medical professional, facsimile machine, telephone exchange, video monitor (e.g., touch screen), software, electronic mail account, and user interface constitute exemplary means for receiving from the consumer 202. In one example, the consumer 202 contacts the resource 204 via a telephone number or network address (e.g., a universal resource locator) on the packaging of the personal care product, a sample of the personal care product, or a related personal care product.

The invention also includes means for generating a three-dimensional model demonstrating use of the personal care product as a function of the physical characteristics and the personal care product. A computing device, software, web site, and human constitute exemplary means for generating.

In addition, the invention includes means for providing to the consumer 202 the requested information at 210 in the form of a visual representation of the three-dimensional model as a function of the received physical characteristics and the personal care product. In one example, the means for providing 210 includes means for sending the requested information (e.g., a generated three-dimensional model) to an electronic device, computing device, or the like associated with or accessible to the consumer 202. For example, the consumer 202 may designate a specific device or medium for receipt of the requested information. Further, audio and/or video recordings (e.g., tutorials) constitute exemplary means for providing 210. In another example, the means for providing 210 includes means for displaying the requested information (e.g., the generated three-dimensional model) to the consumer 202. Also, any of the exemplary means for receiving 208 constitute exemplary means for providing 210. For example, the user may take a photograph of a product in a retail store using a telephone equipped with a camera and send the photograph along with a request for more information to a customer service representative (CSR). The CSR then sends photographs and other instructional material to the user's telephone for immediate viewing. In another embodiment, the means for providing 210 includes the means for generating.

The invention also includes means for manipulating the provided visual representation of the three-dimensional model at 212 responsive to input from the consumer 202. In one embodiment, the means for manipulating 212 includes means for receiving another request from the consumer 202 to manipulate the provided three-dimensional model, modifying the provided three-dimensional model in response to the request, and providing the modified three-dimensional model to the consumer 202 for display. Any of the exemplary means for receiving 208 and the exemplary means for providing 210 constitutes exemplary means for manipulating 212.

Figure 3:
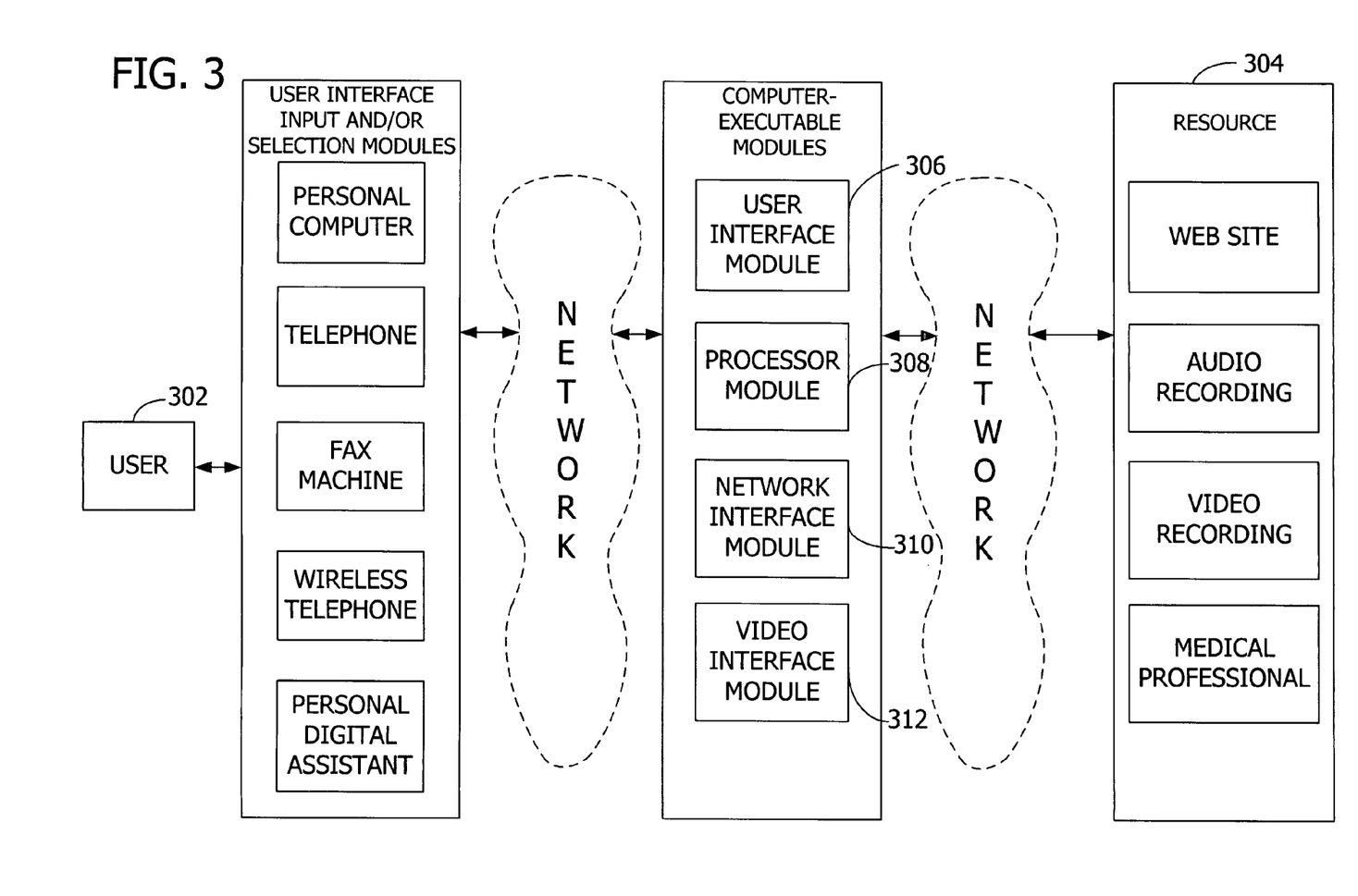
FIG. 3 is an exemplary block diagram illustrating communication between a user and content via computer-executable modules of the invention.

Referring next to FIG. 3, an exemplary block diagram illustrates communication between a user 302 and a resource 304 storing content via computer-executable modules of the invention. The content educates the user 302 about personal care and, in one embodiment, enables the user 302 to make an informed product selection. The resource 304 includes the content itself (e.g., a web site server that delivers content on demand) or is a human with access to the content. The content or content source includes, but is not limited to, any of the following: web site content, content information from a medical professional, an audio recording, and a video recording. The computer-executable modules or components generate a visual model specific to the user 302 to convey the content to the user 302.

The exemplary modules include a user interface module 306, a processor module 308, a network interface module 310, and a video interface module 312. The user interface module 306 receives a request from the user 302 for instruction regarding a personal care product. The user interface module 306 further receives personal data from the user 302 defining physical characteristics of the user 302 that relate to the personal care product. The processor module 308 generates image data representing a three-dimensional model demonstrating use of the personal care product as a function of the personal data received by the user interface module 306 and the personal care product. As a result, the three-dimensional model represented by the generated image data exhibits the physical characteristics of the user 302 as defined by the personal data received by the user interface module 306. In one embodiment, the processor module 308 generates the image data by selecting from image data that has been pregenerated and stored. That is, the processor module 308 has generated and stored additional image data for a plurality of three-dimensional models. The additional image data demonstrates use of a personal care product by users having differing physical characteristics or other distinguishing characteristics. For example, each of the stored plurality of three-dimensional models has a human form corresponding to a particular body geometry. In another example, each of the stored plurality of three-dimensional models is directed to a specific audience (e.g., teens, pre-teens, adults, and persons with medical knowledge). The processor module 308 selects portions of the stored additional image data as a function of the personal data received by the user interface module 306. For example, the processor module 308 selects image data corresponding to a user of a particular gender.

The network interface module 310 transmits or otherwise sends to the user 302, or a computing device or electronic device or the like associated with the user 302, the image data representing the three-dimensional model generated by the processor module 308. In another embodiment, the network interface module 310 provides the requested information or instruction to the user 302 by directing the user 302 to the content associated with the requested information. For example, directing the consumer to the content includes providing the consumer with a password for use at a secure web site containing the requested information. Entering the password at the web site enables the consumer to view the visual representation of the three-dimensional model. In another embodiment, the video interface module 312 displays the three-dimensional model generated by the processor module 308 directly to the user 302.

Interactive communication methods of the invention offer consumers a way to learn about new and existing consumer products that can enhance their lifestyle and life stage at their own pace. Consumers may access these interactive communication methods in the privacy of their home when their schedule allows. Consumers may also record these presentations for later viewing if desired and follow-up with internet/fax/call in for additional information/clarification if the personal hygiene concerns were not addressed in the desired detail. In one example, the invention receives an instruction time from the user 302 and provides the requested information (e.g., the image data associated with a three-dimensional model) at the requested instruction time. The instruction time represents an intentional, configurable delay between requesting the information and receiving the requested information. For example, a parent may schedule the requested information for delivery and consumption at night when the children are home.

In one embodiment, the user interface module 306 further receives a request from the user 302 to manipulate the image data sent by the network interface module 310. In this example, the processor module 308 further modifies the generated image data in response to the request received by the user interface module 306. The network interface module 310 then sends the modified image data to the user 302 (or the video interface module 312 displays the modified image date to the user 302). In one example, the user 302 requests that the three-dimensional model illustrate use of the personal care product by a left-handed user.

FIG. 3 illustrates a networked embodiment of the invention. In particular, the user 302, computer-executable components 306, 308, 310, 312, and the content or sources of content communicate via a network. Those skilled in the art will note that the network may be any communications medium or facility including, but not limited to, the following examples or combinations thereof: a computer network, a telephone network, a wired network, and a wireless network. Further, it is contemplated by the inventors that any of the network connections between any of the elements in FIG. 3 are optional. That is, a direct, non-network connection may exist between any of the elements in FIG. 3.

It is contemplated by the inventors that embodiments of the invention are applicable to one-on-one instruction as well as one-to-many instruction (e.g., classroom). In a classroom embodiment, the invention receives a request for the personal care information or instruction from at least two consumers. The invention then provides the requested information to all requesting consumers simultaneously. In another example, the invention provides the requested information (e.g., broadcasts a video recording over the Internet) at a particular time to all the consumers that have requested the information over a certain time period. In a one-to-many embodiment, the invention includes or is operable with software or hardware that enhances classroom-style learning. In such a classroom scenario, the consumers may ask questions of a moderator or presenter publicly or privately and receive answers publicly or privately. The consumers may also provide feedback to the presenter on the pace of the instruction.

The components illustrated in FIG. 3 represent an exemplary implementation of a software embodiment of the invention. The functionality and structure of embodiments of the invention may be organized and implemented by any quantity of modules, components, or the like stored on one or more computer-readable media. For example, the components may be distributed.

Figure 4:
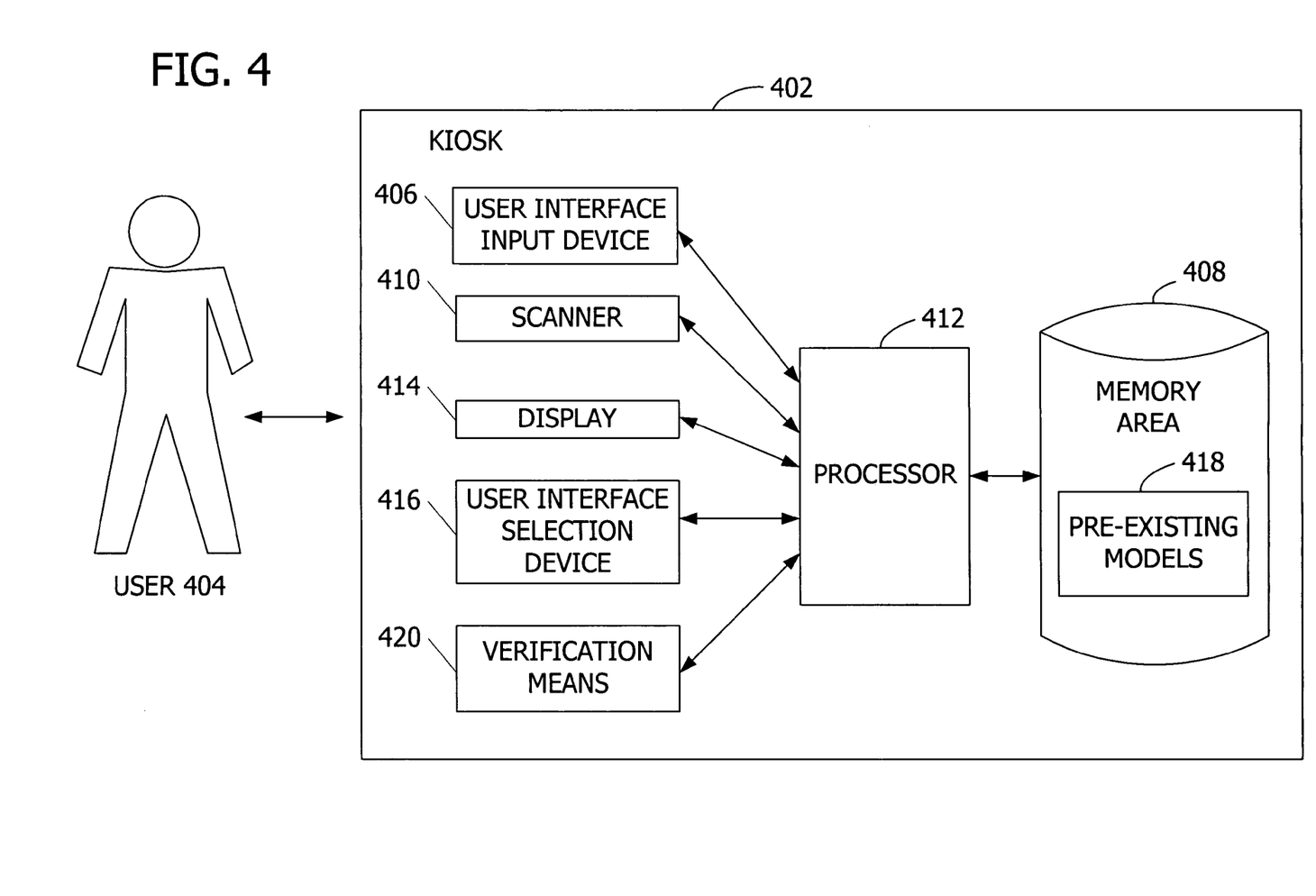
FIG. 4 is an exemplary block diagram illustrating a kiosk of the invention enabling a user to obtain personal care product information at a retail establishment.

Referring next to FIG. 4, an exemplary block diagram illustrates a kiosk 402 of the invention enabling a user 404 to obtain personal care product information at a retail establishment. For example, the personal care product information assists the consumer such as user 404 in making a purchase decision regarding the personal care product at a grocery store.

The kiosk 402 includes a user interface input device 406 for receiving from the user 404 a request for education regarding a personal care product and for receiving personal data from the user 404 defining physical characteristics of the user 404 that relate to the personal care product. The kiosk 402 also includes a memory area 408 for storing the personal data. The kiosk 402 further includes a scanner 410 for reading an identifier associated with the personal care product. The scanner 410 may be any scanning device such as a bar code scanner or a radio frequency identification device. A processor 412 in the kiosk 402 identifies the particular personal care product based on the identifier read by the scanner 410. For example, the processor 412 identifies the particular personal care product in response to receiving a universal product code (UPC) or electronic product code (EPC) associated with the personal care product from the scanner 410. The processor 412 further generates a three-dimensional model or visual representation thereof demonstrating use of the personal care product as a function of the personal data received by the user interface input device 406. In one embodiment, the processor 412 generates a plurality of three-dimensional models each depicting use of a personal care product on a particular human form. The plurality of generated three-dimensional models is stored in the memory area 408 as pre-existing models 418. The processor 412 selects one of the plurality of pre-existing, three-dimensional models 418 stored in the memory area 408 as a function of the personal data and the identified personal care product.

The kiosk 402 further includes a display 414 for displaying the generated or selected three-dimensional model generated by the processor 412 to the user 404 to enable the user 404 to make a purchase decision regarding the personal care product. In another embodiment, the kiosk 402 also includes a user interface selection device 416 for enabling the user 404 to manipulate the three-dimensional model displayed on the display 414.

In another embodiment, the kiosk 402 includes a verification means 420 for verifying an identity of the user 404 and/or authenticating the user 404. A login and password, a bar code scanner, a radio frequency identification scanner, a biometric scanner, and the like constitute exemplary verification means 420. The processor 412 generates the three-dimensional model or other personalized information responsive to the verification means 420. For example, the processor 412 may adjust the quality (e.g., resolution) of an image of a three-dimensional model responsive to the verification means 420. In one example, if the verification means 420 fails to verify the identity of the user 404, the processor 412 may simply generate an error message or a poor quality image of the three-dimensional model. However, if the verification means 420 successfully verifies the identity of the user 404, the processor 412 generates or obtains a high-quality image of the three-dimensional model.

In FIG. 4, the user interface input device 406 and/or the user interface selection device 416 may be a single touch screen device capable of functioning as the display 414. That is, the user interface input device 406 and/or the user interface selection device 416 may function in such an embodiment as an input device and an output device. In another embodiment, the user interface input device 406 is the same device as the user interface selection device 416.

In one embodiment, an interface such as the kiosk 402 is local to the user 404 while the functionality of the processor 412 is located remotely from the interface and/or user 404. For example, the functionality of the processor 412 may be performed by a processor, and/or a human agent or the like located in another country. Alternatively or in addition, the functionality of the processor 412 may be performed by an intelligent agent and/or a live agent or the like.

In one example, a computer three-dimensional model according to the invention models external parts of the human body. Also, the model may include internal details so that, for example, the backward angle of the vagina for proper tampon insertion is shown using this model. In another example, a computer three-dimensional model includes a mesh along with details of the labial region to appear more realistic and user-friendly. Further, some of the mesh details may be hidden and the body illustrated transparently to allow the angle of tampon insertion to be more visible. In one embodiment, the detail for the labial region is realized by combining FIG. 1 of U.S. Pat. No. 6,810,300 with any of FIG. 7, FIG. 7A, FIG. 7B, FIG. 7C, and FIG. 8 of commonly-owned U.S. patent application Ser. No. 10/742,236, filed Dec. 19, 2003. U.S. Pat. No. 6,810,300 and U.S. patent application Ser. No. 10/742,236 are hereby incorporated by reference herein.

Exemplary Operating Environment

The invention is operable with any form of computer or computing device known in the art. A user may enter commands and information into the computing device through input devices or user interface selection devices well known in the art such as a keyboard and a pointing device (e.g., a mouse, trackball, pen, or touch pad). The computer typically has at least some form of computer readable media. Computer readable media, which include both volatile and nonvolatile media, removable and non-removable media, may be any available medium that may be accessed by computer. By way of example and not limitation, computer readable media comprise computer storage media and communication media.

Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media. The invention also includes the computing device itself when programmed according to the methods and techniques described herein.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

The order of execution or performance of the methods illustrated and described herein is not essential, unless otherwise specified. That is, elements of the methods may be performed in any order, unless otherwise specified, and that the methods may include more or less elements than those disclosed herein. For example, it is contemplated that executing or performing a particular element before, contemporaneously with, or after another element is within the scope of the invention.

It is contemplated by the inventors that any of the elements in the drawings may be implemented by a human, a computing device, or both.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained. The invention aids in removing some of the ambiguity with understanding how the human body functions and changes, and how consumer products interact with the body without embarrassing the consumer for their lack of knowledge. The invention creates an environment of comfort for very intimate, personal questions with a "no stupid questions" format. This is especially important with today's changing demographics (e.g., there are more single parents now, a greater percent of the population is over 50, people are living longer, and there is a higher cost of living which increases the in-home caregivers market). With these demographic changes new roles and responsibilities for both genders to understand male/female personal hygiene from birth through elder care are now required.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A method for educating a consumer about a personal care product, said method comprising:
   receiving a request from a consumer for information regarding a personal care product;
   receiving from the consumer a description of one or more physical characteristics associated with the consumer and related to the personal care product;
   determining, by a processor, a legitimacy level of the consumer based on one or more of the following: an age of the consumer, a gender of the consumer, an education level of the consumer, and a religion of the consumer;
   generating, by a processor, a three-dimensional model of the consumer as a function of the received description and the personal care product;
   generating, by a processor, a visual representation of the three-dimensional model as a function of the determined legitimacy level, the visual representation demonstrating a procedure for use of the personal care product on the consumer; and
   providing to the consumer the generated visual representation for display.

2. The method of claim 1, further comprising requesting the description of the one or more physical characteristics from the consumer.

3. The method of claim 1, further comprising receiving a request from the consumer to manipulate the provided visual representation of the three-dimensional model in one or more of the following ways: pan, tilt, zoom, rotate, scale, flip, brighten, darken, adjust the point-of-view, adjust lighting, and adjust colors.

4. The method of claim 1, wherein providing the generated visual representation comprises sending the consumer a pamphlet including the generated visual representation in one or more of the following ways: postal mail and electronic mail.

5. The method of claim 1, further comprising obtaining contact information from the consumer to register the consumer.

6. The method of claim 1, further comprising determining an education level of the consumer, wherein determining the legitimacy level comprises determining the legitimacy level based on the education level of the consumer.

7. The method of claim 1, further comprising identifying the personal care product.

8. The method of claim 7, wherein identifying the personal care product comprises receiving one or more of the following codes associated with the personal care product from the consumer: a universal product code (UPC) and an electronic product code (EPC).

9. The method of claim 1, wherein providing the generated visual representation to the consumer comprises directing the consumer to a content source containing the requested information.

10. The method of claim 9, wherein the content source comprises one or more of the following: a web site, a medical professional, an audio source, and a video source.

11. The method of claim 9, wherein directing the consumer to the content source comprises providing the consumer with a password for use at a web site containing the requested information, and wherein entering the password at the web site enables the consumer to view the visual representation of the three-dimensional model.

12. The method of claim 1, wherein providing the generated visual representation to the consumer comprises displaying the visual representation of the three-dimensional model to the consumer.

13. The method of claim 1, further comprising providing a purchase incentive relating to the personal care product to the consumer.

14. The method of claim 1, wherein receiving the request for the information comprises receiving a request for information regarding one or more of the following: a feminine care product, a baby care product, an elder care product, and a pregnancy test.

15. The method of claim 1, further comprising receiving an instruction time from the consumer, and wherein providing the generated visual representation comprises providing to the consumer the generated visual representation at the received instruction time.

16. The method of claim 1, wherein providing the generated visual representation comprises providing the generated visual representation to a computing device associated with the consumer.

17. The method of claim 1, wherein providing the generated visual representation to the consumer comprises confidentially providing the generated visual representation to the consumer.

18. The method of claim 1, further comprising receiving another request for the information from another consumer, and wherein providing the generated visual representation comprises providing the generated visual representation to the consumer and the other consumer simultaneously.

19. The method of claim 1, further comprising: receiving another request from the consumer for information relating to the provided visual representation of the three-dimensional model; and providing information to the consumer in response to the received other request.

20. The method of claim 1, wherein providing the generated visual representation assists the consumer in making a purchase decision regarding the personal care product.

21. The method of claim 1, wherein the three-dimensional model comprises a pre-existing model which does not correspond to the physical characteristics of the consumer, and wherein the pre-existing model is modified according to anthropometric data corresponding to the physical characteristics of the consumer so that the pre-existing model more closely approximates the physical characteristics of the consumer.

22. The method of claim 1, wherein receiving the request for information regarding the personal care product comprises receiving a request to illustrate use of a feminine care product.

23. The method of claim 1, wherein providing the generated visual representation to the consumer comprises providing, by a human agent, the generated visual representation to the consumer in a confidential setting.

24. The method of claim 1, wherein providing to the consumer the generated visual representation comprises providing to the consumer the generated visual representation in the form of a sequence of visual representations of the three-dimensional model to animate the three-dimensional model.

25. The method of claim 24, wherein the sequence of visual representations comprises a series of events pertaining to the personal care product.

26. The method of claim 1, wherein providing to the consumer the generated visual representation comprises providing to the consumer the generated visual representation in the form of the visual representation of the three-dimensional model via one or more of the following: a computing device and an electronic device.

27. The method of claim 1, wherein one or more computer-readable media have computer-executable instructions for performing the method recited in claim 1.

28. A method of enabling a resource to educate a consumer, said method comprising:
 receiving from the consumer, by the resource, a request for information regarding a personal care product;
 receiving from the consumer, by the resource, a description of one or more physical characteristics associated with the consumer and related to the personal care product;
 determining, by a processor associated with the resource, a legitimacy level of the consumer based on one or more of the following: an age of the consumer, a gender of the consumer, an education level of the consumer, and a religion of the consumer;
 generating, by a processor associated with the resource, a three-dimensional model of the consumer as a function of the transmitted description and the personal care product;
 generating, by a processor associated with the resource, a visual representation of the three-dimensional model demonstrating a procedure for use of the personal care product on the consumer, the visual representation based on the determined legitimacy level; and
 electronically transmitting, from the resource to the consumer, the generated visual representation for display.

29. The method of claim 28, wherein the resource comprises one or more of the following: a customer service representative (CSR), a database, a server, and an agent.

30. The method of claim 28, further comprising: transmitting, from the consumer to the resource, a request to manipulate the visual representation of the three-dimensional model; and transmitting, from the resource to the consumer, a visual representation of the manipulated three-dimensional model.

31. The method of claim 28, wherein transmitting the generated visual representation assists the consumer in making a purchase decision regarding the personal care product.

32. The method of claim 28, wherein transmitting the request for information comprises transmitting a request to illustrate use of a feminine care product.

33. The method of claim 28, wherein transmitting the generated visual representation comprises transmitting the generated visual representation in the form of a sequence of visual representations of the three-dimensional model to animate the three-dimensional model.

34. A method for educating a consumer about a personal care product in a confidential setting, said method comprising:
 receiving, by a human agent, a request from a consumer for information regarding a personal care product;
 receiving from the consumer a description of one or more physical characteristics associated with the consumer and related to the personal care product;
 determining, by a computing device, a legitimacy level of the consumer based on one or more of the following: an age of the consumer, a gender of the consumer, an education level of the consumer, and a religion of the consumer;

selecting, by a computing device, a multimedia resource from a repository of multimedia resources based on the personal care product and the received description of the one or more physical characteristics, wherein the selected multimedia resource corresponds to the consumer and the determined legitimacy level; and providing to the consumer the requested information confidentially in the form of the selected multimedia resource, wherein the selected multimedia resource demonstrates a procedure for use of the personal care product on the consumer.

35. The method of claim 34, wherein selecting the multimedia resource comprises selecting one or more of the following: a three-dimensional model, a movie, and an audio clip.

36. The method of claim 34, wherein selecting the multimedia resource comprises selecting a visual representation of the multimedia resource.

37. The method of claim 34, wherein receiving the request for information regarding the personal care product comprises receiving a request to illustrate use of a feminine care product.

38. The method of claim 1, wherein providing the generated visual representation as a function of the determined legitimacy level comprises determining one or more of the following based on the determined legitimacy level: a color of the three-dimensional model, an image quality of the visual representation, and a realism of the visual representation.

* * * * *